July 12, 1966 W. A. SUGDEN 3,260,520

DOCUMENT HANDLING APPARATUS

Filed March 9, 1964 3 Sheets-Sheet 1

INVENTOR.

BY WILLIAM A. SUGDEN

Arnold E. Renner

ATTORNEY

July 12, 1966 W. A. SUGDEN 3,260,520
DOCUMENT HANDLING APPARATUS
Filed March 9, 1964 3 Sheets-Sheet 2
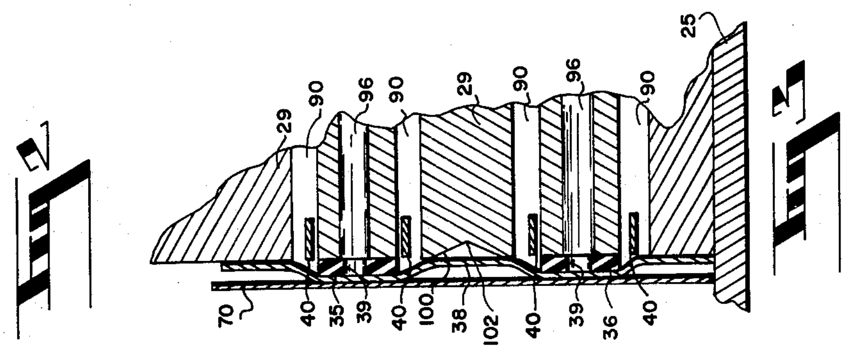
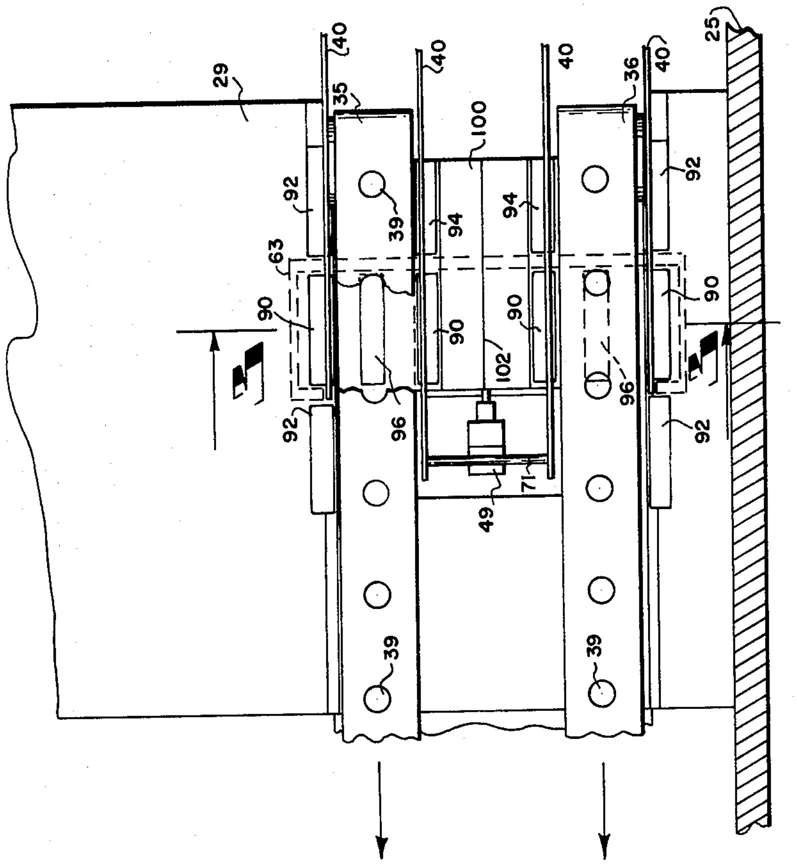
INVENTOR.
BY WILLIAM A. SUGDEN
ATTORNEY

DOCUMENT HANDLING APPARATUS

Filed March 9, 1964 3 Sheets-Sheet 3

INVENTOR.
WILLIAM A. SUGDEN
BY [signature]
ATTORNEY 3,260,520
Patented July 12, 1966

3,260,520

DOCUMENT HANDLING APPARATUS

William A. Sugden, Phoenix, Ariz., assignor to General Electric Company, a corporation of New York Filed Mar. 9, 1964, Ser. No. 350,272
10 Claims. (Cl. 271—26)

The present invention relates to a document handling apparatus and more particularly to an apparatus for supplying only the end or foremost document from a stack of documents to a document transporting apparatus.

Electronic and mechanical data processing systems used today in a wide variety of applications frequently utilize document handling systems. Such a document handling system may be, for example, of the type described in United States Patent No. 3,108,694, "System for Collating Documents in Response to Indicia Appearing Thereon," by N. R. Crain et al., issued October 29, 1963, and assigned to the assignee of the present invention. The handling system described in the Crain et al. patent sorts a large number of documents according to information contained thereon. The information may be, for example, in the form of magnetizable characters, punched holes, or optically readable characters which an automatic reading device is capable of recognizing.

The documents to be processed in the document handling system are normally stored in a stack containing large numbers of such documents in a surface to surface relationship with each other. The handling system usually includes a transporting apparatus which transports the documents one by one, or serially, past a reading device and past one or more operating stations such as sorting stations. The system thus requires apparatus for feeding or supplying the documents serially to the transporting apparatus from the supply stack. Such apparatuses are commonly called document feeding devices or simply, feeders.

The physical properties of the documents to be handled may vary from relatively thick but flexible and resilient sheets of material used for applications such as punched cards to relatively thin but flexible and resilient sheets of material such as that used for bank drafts or checks. The flexibility of a document normally increases and the resiliency decreases as the document is increasingly handled. Thus, the resiliency and flexibility properties of the documents in a stack of documents may vary considerably from document to document.

In the majority of prior art document feeders, the stack of documents is urged toward a moving, forward driving medium such as a belt or belts. One surface of the end or foremost document of the stack is urged into direct contact with a frictional surface of the forward driving medium and is thereby accelerated toward a document transporting apparatus positioned a short distance away. However, the document immediately behind and next to the foremost document may adhere to the foremost document for reasons such as, for example, dirt, ragged edges of punched holes, or electrostatic attraction. The adhering next document thus tends to be accelerated along with the foremost document resulting in two documents being fed to the transporting apparatus at a single time. Such a feeding of two documents at the same time is known in the art as a double feed, and one measure of effectiveness of any feeding apparatus is the number of double feeds which occur in the sorting of a given number of documents.

Numerous systems have been employed in the past to prevent a second or adhering next document from being carried into the transporting apparatus along with the foremost document. Included in these systems is the use of forward feed belts driven in a first direction and a reverse feed belt which is driven in a direction opposite to that of the forward feed belts. The reverse feed belt has a frictional surface and is designed to frictionally engage any second document being fed along with the foremost document and by the action of the reverse belt return such second fed document to the stack. Such a configuration is shown in U.S. Patent 3,198,514, by Frank B. Barbera et al., "Document Feeding System," issued August 3, 1965, and assigned to the assignee of the present invention. In any system embodying a reverse belt, some means must be employed to cause any double fed document to contact and adhere to the reverse belt. In the aforementioned application, the engagement of a double fed document with the reverse belt is achieved through the use of vacuum means associated with the reverse belt which serves to laterally separate the documents of such a double feed and to cause all but the foremost document to be returned to the stack by the reverse belt.

A second type of construction known in the prior art for preventing an adhering second document from being carried into the transporting apparatus by the foremost document also utilizes forward and reverse feed belts. The document engaging frictional surfaces of both the forward and the reverse belts lie in substantially the same plane and each belt acts upon each document which is supplied to the transporting apparatus. The successful operation of this system is dependent upon the proper balance of the frictional engagement of the reverse driving belt on one surface of a single document and the frictional engagement of the forward driving belt on the opposite surface of that document. With a single document disposed between the forward and reverse belts, the frictional engagement of the forward driving belt must control and drive the document forward; the other surface of the document merely slips against the reverse driving belt. When a second document adheres to the foremost document, the reverse driving belt acts only upon a surface of this adhering document. The frictional engagement of the reverse driving belt with the surface of the adhering document must be greater than the frictional engagement between the two adhering documents in order to effectively grip the adhering document, break or shear it away from the foremost document and drive the formerly adhering document back into the stacking compartment. Furthermore, the frictional engagement of the forward driving belt with the surface of the foremost document must be greater than the frictional engagement between the adhering documents.

While both of these systems have been used with reasonable success, they each permit a greater number of double feeds than is desirable. In the first of these systems, the vacuum associated with the reverse drive belt may be insufficient to effect a separation between two documents which adhere together very tightly. The second system requires a very delicate balance of frictional coefficients. This balance must be maintained even though both the reverse and forward belts wear with usage. In addition, the amount of adherence between two dockets is not predictable and, in a like manner, different materials adhere with various degrees of adhesion to a particular belt.

It is, therefore, an object of this invention to provide an improved document feeder for a document handling system.

It is another object of this invention to provide an improved document feeder for a document handling system which will accurately feed intermixed relatively thin and relatively thick documents into the system one at a time and in a spaced relationship.

It is a further object of this invention to provide an improved document feeder for a document handling system which will feed only the foremost document of a stack of documents to a document transporting apparatus.

It is still another object of this invention to provide, in a document handling system, a device for returning to a stack of documents a second document adhering to a first document.

Briefly stated, the present invention provides a document feeding mechanism which insures a very low number of double feeds to the transporting apparatus. In the form of the invention illustrated in the accompanying drawings, there is included a pair of spaced forward feed belts which provide documents with motion along the path of the belts. These forward feed belts are provided with a plurality of perforations extending along their length. Vacuum is applied to a document to be fed, through the perforations of the belts, at a particular designated area along the path of belt travel. Vacuum is also applied to the document in the area immediately adjacent the forward feed belts through suitable apertures positioned within a plate against which the belt slides and a portion of the document rests as it is being transported. By thus applying vacuum to the document, firm contact of the document with the forward feed belts is assured. Additionally, through a particular configuration of the plate, vacuum relief is provided in order that the vacuum is confined to a particular region.

The document feeding mechanism of the present invention further includes a reverse feed medium, shown in the drawings in the form of a belt. The reverse feed belt is inclusive of a frictional surface disposed between and interlaced with the two forward feed belts. That is, the frictional surface of the reverse belt lies in a plane displaced with respect to the plane of the frictional surfaces of the forward feed belts. This displacement is such that a document disposed between the forward and the reverse belts is deformed along its length. This particular configuration provides that the reverse belt is in contact with one surface of each document as it is supplied to the transporting apparatus thus better insuring that double feeds do not occur. As a means to further enhance the action of the reverse feed belt, suitable ports are positioned adjacent the reverse belt on either side thereof. By supplying a suitable vacuum to these ports, it is insured that second fed documents are positioned in intimate contact with the reverse feed belt.

There is additionally provided, in the apparatus of the present invention, a reverse feed block assembly which serves the purpose not only of housing a portion of the reverse feed belt but also includes a curved surface in the region immediately adjacent the document stack. This curved surface aids in document separation by presenting, in the region adjacent the foremost document, a surface against which the documents may abut in a stepped relationship.

Further objects and advantages of the invention will become apparent as the following description proceeds and features of novelty which characterize the invention are pointed out in particularity in the claims annexed to and forming a part of this specification.

For a better understanding of the invention, reference is made to the accompanying drawings in which:

FIG. 2 is a view of the forward feed belt and support plate associated therewith, taken along a line 2—2 of FIG. 1;

FIG. 3 is a sectional view, taken along line 3—3 of FIG. 2, having, added thereto, a foremost and second document to illustrate the relationship between the forward feed belts and these documents;

Figure 1:
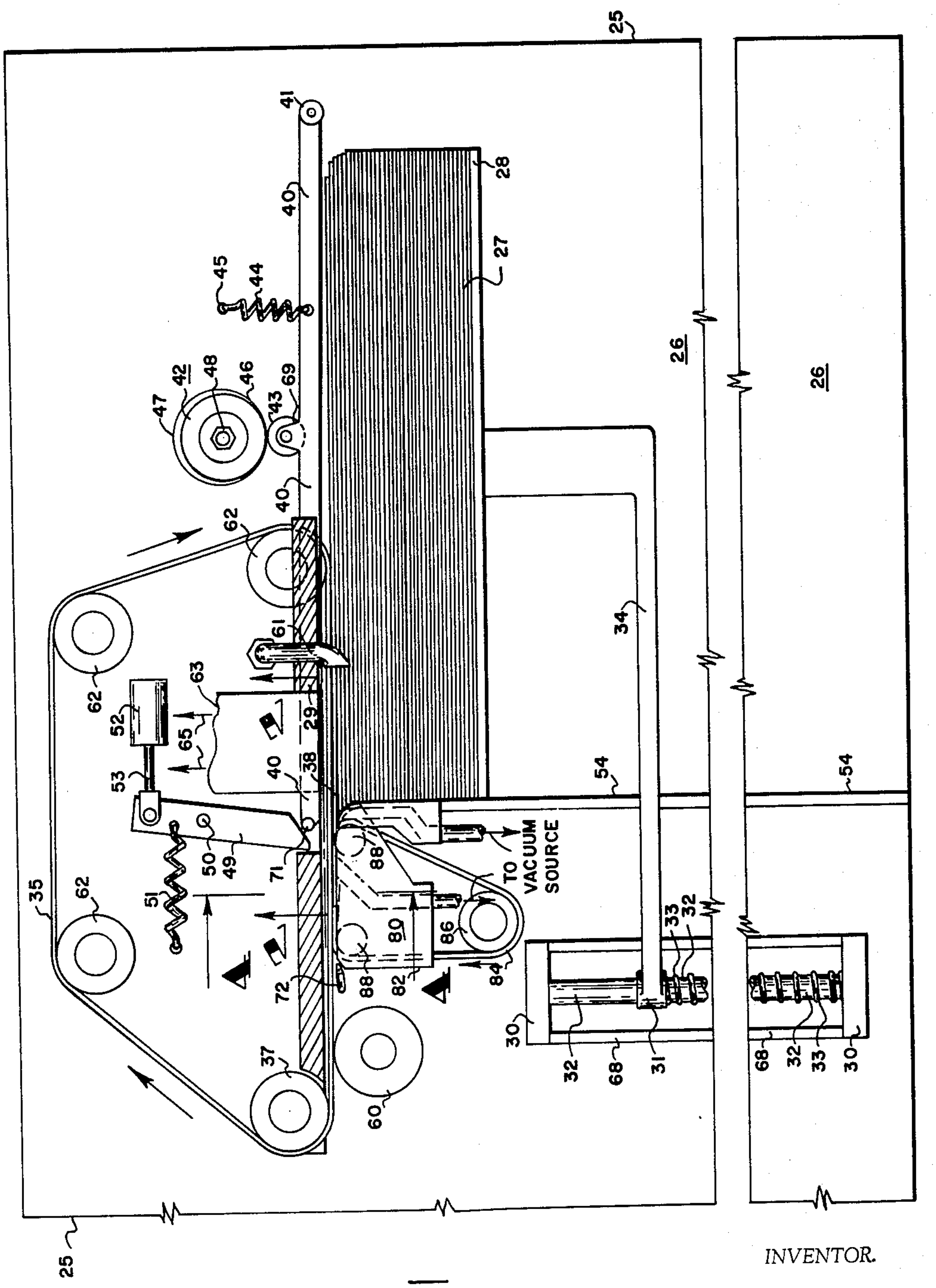
FIG. 1 is a top elevational view of a document feeding apparatus including the features of the present invention.

With reference now to FIG. 1 there is shown a base 25 for maintaining and supporting the various structural elements of the document feeder in accordance with the present invention. A portion of the base 25 serves as a document supply hopper 26 which is bounded on the left by a plate 54. The hopper 26 is adapted to store a stack of documents 27. In order to urge the documents of the stack 27 towards the feeder mechanism of the present invention there is provided an assembly which includes a support frame comprising a base portion 68 and two upstanding members 30. This support frame is positioned on the base 25 at the left hand side of the hopper 26. A bushing support rod 32, maintained in a horizontal position between the members 30, is provided with a slidably mounted bushing 31. A plate support arm 34, attached to the bushing 31, extends outward from the bushing 31 into the hopper 26. At the free end of the arm 34 there is secured a support plate 28 which is in contact with the stack 27. A coiled biasing spring 33, mounted on the support rod 32 between the rearward member 30 and the bushing 31, acts through the arm 34 and the plate 28 to maintain the documents of the stack 27 in an upright position and disposed within the region immediately adjacent the feeder mechanism of the present invention.

The feeder mechanism of the present invention includes a document accelerating medium which extends across a feeder plate 29. In FIGS. 1 to 3 this medium is shown as a pair of continuously moving forward feed belts 35 and 36 each of which is positioned by a driving pulley 37 and a plurality of idling pulleys 62. Driving pulley 37 may be rotated continuously in the clockwise direction (as shown in FIG. 1) by any suitably connected rotating means such as an electrical motor (not shown). The portion feeder plate 29 in the region of the stack 27 is basically a planar surface but includes particular nonplanar areas for vacuum relief. The inner surfaces of the belts 35 and 36 slide against this portion of the plate 29. The outer surfaces of the belts 35 and 36, which are of a frictional nature, are thus located away from the surface of the plate 29 by a distance substantially equal to the thickness of the belts. A more complete description of this portion of the present invention will be presented later in this specification, the present intention being only to generally provide a means for moving documents from the stack 27. This movement is achieved when the foremost or end document 38 of the stack 27 is engaged by the frictional surfaces of the belts 35 and 36.

A series of movable gate members or fingers 40 are provided for maintaining the stack of documents 27 in a spaced apart relation with the forward drive belts 35 and 36 when it is desired not to feed documents. The fingers 40 are pivoted at one end about a pivot support 41 and extend leftwardly from the pivot support 41, to a point slightly beyond the left hand edge of the stack 27. In FIG. 1 the fingers 40 are shown in their feeding position, that is, in a position which allows the foremost document 38 of the stack 27 to come into contact with the feed belts 35 and 36 to thus permit that foremost document to be fed to the transporting apparatus. In the feeding position, the fingers 40 are situated behind the front frictional surfaces of the belts 35 and 36. The fingers 40 may be pivoted, in what in FIG. 1 is the counter clockwise direction, to position the fingers such that they extend beyond the frictional surfaces of the belts 35 and 36. In this position, the documents are maintained out of engagement with the forward feed belts 35 and 36 and no document will be fed by the action of the belts.

Proper timing and operational control of the fingers 40 is accomplished through a rotatable cam 42 which is continuously rotated at a constant speed in synchronism with other elements of the document handling system. A roller type cam follower 43 is attached to the fingers 40 by means of a connecting member 69. A spring 44, attached between a spring support 45 and fingers 40, biases the fingers 40 in the feeding position and biases cam follower 43 against cam 42.

The cam 42 is arcuately formed to have a specified number of degrees of low surface 46 and of high surface 47. When cam follower 43 is following the low surface 46, the fingers 40 are in their feeding position. When the cam follower 43 is following high surface 47 the fingers 40 are in their non-feeding position. The number of degrees of the cam which is low surface 46 determines the percentage of time per revolution of the cam 42 that the fingers are in their feeding position. By means of an adjusting nut 48 the cam 42 may be adjusted in position with respect to other elements of the document handling system such that the cam follower 43 may begin to follow the low cam surface 46 at predetermined time during the operation of the document handling system.

Further operational control is provided by a lock which is responsive to an electrical feed signal, from an external source, for allowing the fingers 40 to move to their feeding position only when desired rather than during each revolution of the cam 42. The lock includes a pivot arm 49 pivoted at approximately its midpoint on pivot arm support 50. A spring 51 connected between the base 25 and one end of pivot arm 49 biases the arm in the counter clockwise direction. An electrically operated solenoid 52 is mounted approximately opposite spring 51. An armature 53 of the solenoid 52 is coupled to the pivot arm 49 near the spring attachment point. When the solenoid is not energized the bias on pivot arm 49 pulls or holds the armature 53 in its outward or non-energized position which has not been illustrated. When the solenoid is energized by an electrical signal, the armature 53 is retracted to the right thereby overcoming the force of spring and thus pivoting arm 49 a few degrees in the clockwise direction. Such a position of the arm is illustrated in FIG. 1.

When the solenoid 52 is not energized and the fingers 40 are in their non-feeding position, the left hand tips of the fingers 40 are biased against a lower tip 71 of the pivot arm 49 by the force of spring 44. Thus, when the low surface 46 of the cam 42 is presented to the cam follower 43 the fingers are prohibited or prevented from being moved in a feeding position; the fingers are thus locked in a non-feeding position and rest against the lower tip 71 of arm 49.

When it is desired to feed the foremost document 38 of the stack 27, an electrical feed signal is applied to the solenoid 52 at some instant of time during which the high surface 47 of the cam 42 is adjacent to the cam follower 43. As illustrated in FIG. 1, when the solenoid 52 is thus energized, the arm 49 is pivoted in the clockwise direction thereby moving the lower tip 71 of the arm 49 away from the left hand tips of the fingers 40. The fingers are now under the control of the cam 42 and are free to move to their feeding position which they do as the cam follower 43 follows the low surface 46 of cam 42. As the cam 42 continues its rotation, high surface 47 is presented to the cam follower 43 and causes the fingers to be moved or pivoted to their non-feeding position. De-energization of the solenoid 52 will now permit the pivot arm 49 to move back into its finger locking position under the force of the spring 51.

Thus, a means for controlling the movement of the fingers 40 has been provided. If desired, successive foremost documents of the stack 27 may be fed one after another with each rotation of the cam 42 by merely maintaining a continuous electrical feed signal on the solenoid 52.

Although cam timing and operation of the fingers 40 has been shown and described, other suitable devices such as torque motors or solenoids plus associated controls can be used with equal facility. It should be noted that when documents are rapidly fed with each revolution of the cam 42 the fingers 40 provide a beating action on the stack 27 which tends to maintain the stack of documents recessed a short distance in the hopper 26. When the fingers 40 are moved to their feeding position, pressure along the entire length of the foremost document is suddenly relieved and the foremost document 38 is thus more readily separated from the next document in the stack 27.

Further means may be employed to aid in the separation of documents immediately adjacent the feed belts 35 and 36. In FIG. 1 there is shown two nozzles 61 and 72 which are connected to a source of positive air pressure. Air is directed by the nozzles 61 and 72 towards the stack 27 in directions edgewise with respect to the documents in the stack. As shown in FIG. 1, nozzle 61 directs air towards the top edges of the documents and nozzle 72 directs air towards the leading edges of the documents. This forced air has a tendency to separate the documents one from another and to maintain them in a separated relationship as an aid in facilitating the removal only of the foremost document 38 from the stack 27.

The foregoing description is primarily intended for the establishment of a suitable environment for the feeder mechanism of the present invention and is substantially the same as that described in the aforementioned Patent 3,198,514, by F. B. Barbera et al.

The present invention includes further apparatus and apparatus configuration, used in conjunction with a suitable environment such as has been described, to remove only the foremost document from a stack of documents.

Referring now to FIGS. 2 and 3 there is shown the relationship between forward feed belts and the feeder plate 29. As illustrated, each of the belts 35 and 36 is provided with a plurality of perforations or apertures 39 which extend the length of the belt. The inner surfaces of the belts 35 and 36, which slide against the surface of the plate 29, are relatively smooth while outer surfaces of the belts 35 and 36 are of a frictional nature to enhance the engagement of these surfaces with the foremost document 38 of the stack 27. A first plurality of apertures or ports 90 are provided in the plate 29 closely adjacent to the belts 35 and 36. These ports 90 are in substantial alignment with one another and are connected through a suitable conduit 63 (FIG. 1) to a vacuum source represented by arrows 65. This same vacuum source may also be connected, via conduit 63, to the perforations 39 through suitable ports 96 in the plate 29. The ports 96 are in substantial alignment with the ports 90. The vacuum applied to the ports 90 and to the perforations 39 serves to attach the foremost document 38 of the stack 27 to the belts 35 and 36 in order that this document 38 may be forwarded to the transport medium of the system.

Immediately adjacent each of the two outer vacuum ports 90 are two additional ports 92 which are merely apertures extending through the plate 29 and in communication with the atmosphere. Two additional apertures or ports 94 are positioned one immediately adjacent each of the inner vacuum ports 90. The ports 94 are also connected to atmosphere. The ports 92 and 94 serve as vacuum relief and act to maintain the vacuum which is occasioned through the apertures 39 and the vacuum ports 90 within a limited region.

Further vacuum relief is provided in the region of the ports 90 through the use of a contoured portion 100 of the plate 29. The contour of the portion 100 provides a recessed region 102, as viewed from the surface of the plate 29. While the particular configuration of the recessed region 102 is not critical in the present invention, that illustrated in FIG. 3 is substantially V-shaped. This particular shape is readily manufactured and additionally provides that a document sliding over the region rests upon what are, essentially, two small area edges. Each end of the recessed region 102 is open to atmosphere to insure that vacuum does not exist between the portion 100 and a document being moved over that portion. By these vacuum relief means, vacuum is prevented from "creeping" along the document surface between the document and the plate 29 to thus minimize the frictional forces existing between the plate 29 and a document moving over the plate. By minimizing those frictional forces, the documents are fed by the belts 35 and 36 at a more constant rate. Thus the timing initially established by the fingers 40 is more accurately maintained as the document is fed to the transporting apparatus.

The manner in which vacuum is applied to the foremost document 38 is best seen in FIGS. 2 and 3. The ports 96, provided within the plate 29, are in registration with the paths of belts 35 and 36 and, as has been stated, each of the ports 96 is connected to a source of vacuum via the conduit 63. The ports 96 are preferably slightly greater in width than the diameter of the perforations 39 and may extend along the path of the belt travel any desired length to properly effect the feeding of documents. Thus, as the forward feed belts 35 and 36 are caused to move along their path, successive perforations 39 of the belts 35 and 36 come into registration with the ports 96 and the vacuum is thus supplied to the outer frictional surface of the forward feed belts 35 and 36. As the forward feed belts 35 and 36 are given motion in the clockwise direction, as viewed in FIG. 1, and when the fingers 40 are retracted to their feed position (that illustrated), the foremost document 38 of the stack 27 is brought into contact with the outer frictional surfaces of the two feed belts 35 and 36. The portion of the feed plate 29 which includes the ports 90 and 96 is located near the leading edge of the document stack 27. With the application of vacuum to the belt perforations 39 and the vacuum ports 90, the foremost document 38 is caused to adhere to the frictional surfaces of the forward feed belts 35 and 36 and to be transported to the left as viewed in FIG. 1. As is illustrated in FIG. 3, the document 38 being thus transported is deformed in a direction transverse to its length under the action of the several vacuum means. This deformation serves to give the document a rigidity which is not present in its flat form. The use of the perforations 39 within the forward feed belts serves to maintain a large area of document contact with the belts 35 and 36 to firmly grasp the foremost document 38 as it is being fed. As has been previously stated, the several vacuum relief means act to minimize friction between the moving document and the plate 29.

Figures 4, 5:
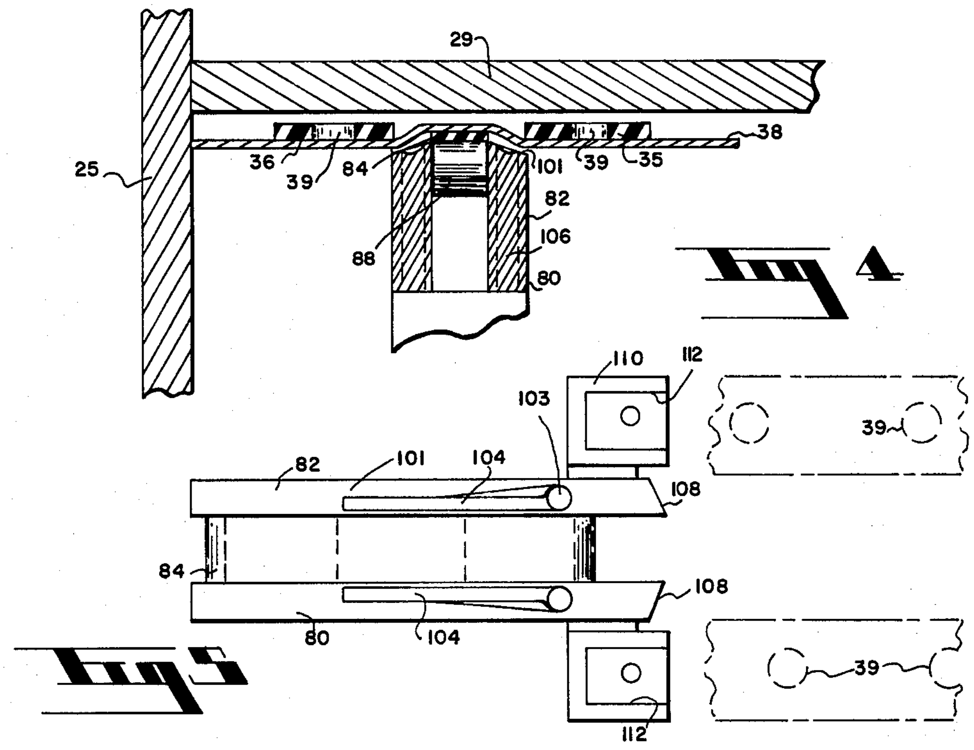
FIG. 4 is a sectional view, taken along line 4—4 of FIG. 1, showing the relationship between the reverse feed belt, the forward feed belts and a document disposed between these belts.
FIG. 5 is a side elevational view of the reverse feed block, reverse feed belt and associated vacuum means in accordance with the present invention; and, FIG. 6 is a top plan view of the apparatus of FIG. 5.
Figure 6:
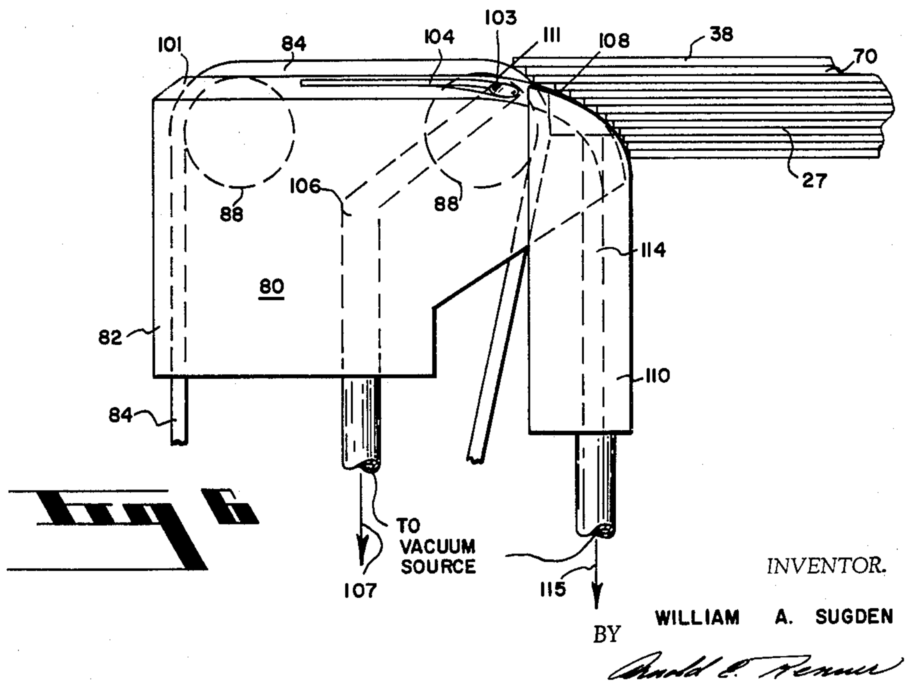

While it has been previously stated that separation of the foremost document 38 from the stack 27 is facilitated through the use of an air blast through the nozzles 61 and 72, this air blast is not usually sufficient to positively separate the foremost document 38 from documents immediately adjacent thereto. To insure the sequential feeding of single documents from the stack 27, there is provided a reverse feed block assembly 80 (FIGS. 4, 5 and 6). The reverse feed block assembly is positioned to the left of the hopper 26 and has its leading edge located immediately to the left of the vacuum ports 96. Reverse feed block assembly 80 includes a reverse block 82 and a reverse feed medium. While the reverse feed medium could assume various forms, e.g. a driven roller, that illustrated is a belt 84 which is wound around a driving pulley 86 and two idler pulleys 88 (FIG. 1). Driving pulley 86 is given motion by a suitable motor means (not shown) such that the direction of movement of that portion of the reverse belt 84 nearest the forward feed belts 35 and 36 is opposite to that of the forward feed belts. Reverse belt 84 extends beyond the block 82 and the entire assembly 80 is positioned, with respect to the forward feed belts, such that the outermost surface of the feed belt 84 is disposed in an interlaced relationship with the forward feed belts 35 and 36. This relationship is best seen in FIG. 4. By interlaced is meant that the reverse belt is not only positioned between the two forward feed belts but also is placed such that a document disposed between the forward and reverse feed belts must be deformed in order to be able to pass between these belts. Disposed within a surface 101 of the block 82, on either side of the reverse belt 84, are means defining two ports 103 which are in communication, via a conduit 106, with a source of vacuum represented by an arrow 107. A groove 104 extends from each of the ports 103 along the surface 101 in the direction of document travel (to the left of FIG. 1). The two grooves 104 serve to extend the effective area of the two ports 103.

The leading portion of the block 82, that portion of the block 82 nearest the hopper 26, is provided with a curved surface 108. The reverse belt 84 does not follow the curved surface 108 but is disposed there behind, when viewed from the hopper 26, so as to be out of contact with documents of the stack 27 when they abut the surface 108. The belt 84 actually enters the block 82 at approximately a point 111 where the surface of the block becomes substantially a straight line as is viewed in FIG. 6 and it is at this point that the documents at the stack first contact the reverse belt. This configuration allows a minimum amount of contact between the reverse belt 84 and the edges of documents within the stack 27. This minimum amount of contact is desirable in that prolonged contact of the moving belt and the document may result in a damaged document edge. The curved surface itself provides a stop against which abut the documents in that portion of the stack 27 nearest the forward feed belts 35 and 36. These documents follow the contour of the curved surface 108 such that they assume a stepped relationship (FIG. 6). This stepping of successive documents provides one of the initial phases of document separation.

Closely associated with the assembly 80 is a bifurcated member 110, the legs of which extend alongside the block 82. The degree of extension of the legs of the bifurcated member 110 in a vertical direction is to a line substantially coincident with the curved surface 108 of the block 82 (FIG. 6). Each of the legs of the bifurcated member 110 is provided with a removed portion to form a cavity 112 which is in communication, via a conduit 114, with a suitable vacuum source represented by arrow 115. The function of the bifurcated member 110 will be explained with respect to the operation of the feeder mechanism which follows.

In the operation of the feeder mechanism, when the fingers 40 are retracted into their feed position, the foremost document 38 of the stack 27 is frictionally engaged by the forward feed belts 35 and 36 and caused to move to the left as was previously described. As there is a certain amount of adherence (because of friction, dirt, etc.) between the foremost document and the second document, between the second and the third documents, and so forth, the movement of the foremost document will tend to move that portion of the document stack 27 nearest the belts 35 and 36 to the left. This movement or migration of this portion of the stack 27, which is aided by the action of the fingers 40 and the air from nozzle 61, will continue until such time as it contacts the curved surface 108 of the reverse block 82. As this contact is made, the documents will begin to separate by assuming staggered positions as it illustrated in FIG. 6. This staggering is aided by the vacuum within the cavities 112 which tends to draw the documents positioned closely thereto into more complete contact with the curved surface 108 resulting in a slight bend or deformation of these documents and to hold the leading edges of these documents away from the forward feed belts 35 and 36.

As the foremost document 38 continues its movement to the left under the action of the forward feed belts 35 and 36, the foremost document, which was originally somewhat deformed under the action of the vacuum at ports 90 (those ports adjacent the forward feed belts), is forced past the curved surface 108 and into contact with the reverse belt 84. Because of the interlace between the forward and reverse belts the deformation of the document is further increased and the document given additional rigidity, by virtue of its deformation, in the direction of its path of travel.

Assuming now that the foremost document deformation, coupled with the air from the nozzles 61 and 72, the action of the fingers 40 and the forces created by the vacuum cavities 112, have been sufficient to separate the foremost document 38 from a second document 70 in the stack 27, the foremost document will be brought into contact with the reverse feed belt 84. However, because the document being thus fed has one surface in greater frictional engagement with the forward feed belts than can be exerted on the opposite surface of the document by the reverse feed belt, the resultant motion of the document is in the forward direction, i.e., to the left in FIG. 1. In this situation, the reverse feed belt merely slides on one surface of the document without affecting its motion.

Should a second document 70 adhere very tightly to the foremost document and not be separated therefrom by the combination of means preceding the action of the reverse feed belt, both the foremost and the second documents will approach a position between the forward and reverse feed belts. This condition is illustrated in FIG. 3. The foremost document is, of course, in secure engagement with and deformed around the forward feed belts as before. The second fed document 70, not being acted upon by the vacuum associated with the forward feed belts, tends to remain flat and is given forward movement only by virtue of its adhesion to the foremost document. With further movement of the two documents, the reverse feed belt contacts the lower surface of the second document and not a surface of the foremost document. The vacuum existing adjacent the reverse belt 84 at the ports 103 and grooves 104 assists in insuring an intimate contact between the second document and the reverse belt. Barring extraordinary attachment of the foremost and second documents, for example by glue, staples, pins, etc., the frictional engagement of the reverse belt on the lower surface of the second document will be greater than the adherence of the two documents and the second fed document will be returned to the stack 27 by the action of the reverse belt. Should more than two documents be fed at the same time, the reverse belt will act sequentially upon all of the documents, returning all but the foremost to the stack 27.

A further feature of the present invention which warrants further comment relates to the document deformation and its relationship with the interlaced forward and reverse feed belts. This configuration, shown in FIG. 4, assures that the reverse feed belt makes good contact with each document as it is fed from the stack 27 to the subsequent transporting apparatus which follows the feeder mechanism of the present invention. It is thus readily seen that even though the stack may contain documents varying greatly in thickness, the reverse belt properly contacts each document as it is being fed. Hence, contrary to that prevalent in much of the prior art, the distance relationship between the forward and reverse belts is not particularly critical and very thin documents may be intermixed with and properly separated from very thick documents without continuous adjustment of belt spacing.

Thus it is seen that there has been shown and described a particular combination of cooperating structures and elements which serve to positively separate second fed documents from the foremost document to permit only the foremost document of a stack to be fed to a transporting medium. This described apparatus is one which acts in a positive manner upon each document fed and will properly separate and feed documents from a stack, one at a time, even though the documents of the stack vary greatly in thickness and other physical characteristics.

While the principles of the invention have been made clear in the illustrative embodiment, there will be immediately obvious to those skilled in the art many modifications of structure, arrangement, proportions, and the elements, materials, and components, used in the practice of the invention, and otherwise, which are particularly adapted for specific environments and operating requirements without departing from these principles. The appended claims are therefore intended to cover and embrace any such modifications, within the limits only of the true spirit and scope of the invention.

What is claimed is:

1. A mechanism for supplying only the foremost document of a stack of documents to a transporting apparatus, said mechanism comprising: a plurality of spaced forward feed belts having a plurality of perforations extending along their lengths; means urging said stack of documents toward said forward feed belts; first vacuum means acting through said perforations of said forward feed belts for effecting the engagement of said foremost document with said forward feed belts; a reverse feed medium interlacing said forward feed belts with said reverse feed medium lying in a plane displaced with respect to the plane of said forward feed belts whereby a document disposed between said forward feed belts and said reverse feed medium is deformed along its length; and second vacuum means associated with said reverse feed medium to effect the engagement of documents with said reverse feed medium.

2. A mechanism for supplying only the foremost document of a stack of documents to a transporting apparatus, said mechanism comprising: a plurality of spaced forward feed belts; means urging said stack of documents toward said forward feed belts; first vacuum means associated with said forward feed belts for effecting the engagement of said foremost document with said forward feed belts; a reverse feed medium interlacing said forward feed belts with said reverse feed medium lying in a plane displaced with respect to the plane of said forward feed belts whereby a document disposed between said forward feed belts and said reverse feed medium is deformed along its length; and second vacuum means associated with said reverse feed medium to effect the engagement of documents with said reverse feed medium.

3. A mechanism for supplying the foremost document of a stack of documents to a transporting apparatus, said mechanism comprising: a plurality of spaced forward feed belts each having a plurality of perforations extending along its length; means urging said stack of documents toward said forward feed belts; first vacuum means acting through said perforations of said forward feed belts for effecting the engagement of said foremost document with said forward feed belts; second vacuum means adjacent said forward feed belts for enhancing the action of said first vacuum means and for deforming said foremost document around said forward feed belts; a reverse feed belt interlacing said forward feed belts whereby a document disposed between said forward and reverse feed belts is further deformed along its length; and third vacuum means associated with said reverse feed belt to effect the engagement of document with said reverse feed belt.

4. A mechanism for supplying the foremost document of a stack of documents to a transporting apparatus, said mechanism comprising: a plurality of spaced forward feed belts; vacuum means associated with said forward feed belts for effecting the engagement of said foremost document with said forward feed belts; a reverse feed belt interlacing said forward feed belts with said reverse feed belt lying in a plane displaced with respect to the plane of said forward feed belts whereby a document disposed between said forward and reverse feed belts is deformed along its path of travel; and additional vacuum means associated with said reverse feed belt for effecting the engagement of documents with said reverse feed belt.

5. A mechanism for supplying only the foremost document of a stack of documents to a transporting apparatus, said mechanism comprising: a pair of spaced forward feed belts each having a plurality of perforations extending the length thereof; means urging said stack of documents toward said forward feed belts; first vacuum means acting through said perforations of said forward feed belts and second vacuum means adjacent said forward feed belts for effecting the engagement of said foremost document with said forward feed belts; a reverse feed belt interlacing said forward feed belts whereby a document disposed between said forward and reverse feed belts is deformed along its length; and third vacuum means associated with said reverse feed belt for effecting engagement of documents with said reverse feed belt.

6. A mechanism for supplying the foremost document of a stack of documents to a transporting apparatus, said mechanism comprising: forward and reverse feed belts, said forward feed belt containing a plurality of perforations extending along the length thereof, said forward and reverse feed belts being interlaced with said reverse feed belt lying in a plane displaced with respect to the plane of said forward feed belt whereby a document disposed between said belts is deformed along its length; first means for applying a vacuum to said perforations and adjacent the edges of said forward feed belt to effect the frictional engagement of said foremost document with said forward feed belt; second means for applying a vacuum adjacent the edges of said reverse feed belt to insure frictional engagement of documents with said reverse feed belt; and vacuum relief means associated with said forward feed belt whereby said vacuum of said first means is maintained within a limited region.

7. A mechanism for supplying the foremost document of a stack of documents to a transporting apparatus, said mechanism comprising: two moving forward feed belts, having frictional surfaces, disposed towards said stack of documents; a reverse feed belt, having a frictional surface, moving in a direction opposite to that of said forward feed belts, said frictional surface of said reverse feed belt interlacing said frictional surfaces of said forward feed belts with said frictional surface of said reverse feed belt lying in a plane displaced with respect to the plane of said frictional surfaces of said forward feed belts; means for urging said stack of documents towards said forward feed belts whereby said foremost document contacts said frictional surfaces of said forward feed belts and is removed from said stack by the movement of said forward feed belts; and vacuum means associated with each of said belts for enhancing the frictional engagement of documents with said frictional surfaces; said reverse feed belt frictionally engaging each document removed from said stack and preventing the feeding of all but said foremost document.

8. A mechanism for supplying the foremost document of a stack of doucments to a transporting apparatus, said mechanism comprising: a pair of moving forward feed belts having frictional surfaces disposed towards said stack of documents; means urging said stack of documents towards said frictional surfaces; a feed plate against which said forward feed belts are slidably retained; means defining a first plurality of apertures within said plate for the application of a vacuum to said foremost document, said apertures positioned adjacent said forward feed belts; vacuum relief means included within said plate for maintaining said vacuum applied to said foremost document within prescribed limits, said vacuum relief means comprising means defining a second plurality of apertures extending through said plate and in communication with atmosphere, said second plurality of apertures disposed adjacent said first plurality of apertures, said vacuum relief means further comprising a recessed region within said plate in the area between said forward feed belts; and a reverse feed belt, having a frictional surface, moving in a direction opposite to that of said forward feed belts, said reverse feed belt interlacing said forward feed belts, said reverse feed belt contacting each document supplied to said transporting apparatus and preventing all but said foremost document from being so supplied.

9. A mechanism for supplying only the foremost document of a stack of documents to a transporting apparatus, said mechanism comprising, in combination: a pair of moving forward feed belts having frictional surfaces disposed in substantially the same plane, said forward feed belts spaced apart from one another and each having a plurality of perforations extending along their length; means urging said stack of documents toward said forward feed belts whereby said foremost document of said stack engages said frictional surfaces; first vacuum means acting through said perforations whereby said foremost document is frictionally engaged by said frictional surfaces to be transported in a path towards said transporting apparatus by said forward feed belts; and a reverse feed block assembly positioned along said path adjacent said stack of documents, said reverse feed block assembly comprising a reverse feed belt having a frictional surface and moving in a direction opposite to said forward feed belts, said reverse feed belt interlacing said forward feed belts with said frictional surface of said reverse feed belt lying in a plane displaced with respect to the plane of said frictional surfaces of said forward feed belts whereby a document disposed between said forward and reverse feed belts is deformed along its path of travel, said interlacing also providing that each document so disposed between said belts is in frictional engagement with all of said belts, second vacuum means associated with said reverse feed belt for enhancing the engagement of said document with said reverse feed belt, said reverse feed belt serving to act upon other documents than said foremost document of said stack to return said other documents to said stack, said reverse feed block assembly further including a curved surface portion in an abutting relationship with a portion of said stack of documents whereby those documents so abutting said curved surface are maintained in a stepped relationship to one another.

10. A mechanism for supplying only the foremost document of a stack of documents to a transporting apparatus, said mechanism comprising, in combination: a pair of moving forward feed belts having frictional surfaces disposed in substantially the same plane, said forward feed belts spaced apart from one another and each having a plurality of perforations extending along their length; means urging said stack of documents toward said forward feed belts whereby said foremost document of said stack engages said frictional surfaces; first vacuum means acting through said perforations and adjacent the edges of said forward feed belts whereby said foremost document is frictionally engaged by said frictional surfaces to be transported in a path towards said transporting apparatus by said forward feed belts; vacuum relief means associated with said forward feed belts whereby the vacuum associated with said forward feed belts is limited to prescribed regions; and a reverse feed block assembly positioned along said path adjacent said stack of documents, said reverse feed block assembly comprising a reverse feed belt having a frictional surface and moving in a direction opposite to said forward feed belts, said reverse feed belt interlacing said forward feed belts with said frictional surface of said reverse feed belt lying in a plane displaced with respect to the plane of said frictional surfaces of said forward feed belts whereby a document disposed between said forward and reverse feed belts is deformed along its path of travel, said interlacing also providing that each document so disposed between said belts is in frictional engagement with all of said belts, second vacuum means associated with said reverse feed belt for enhancing the engagement of said document with said reverse feed belt, said reverse feed belt serving to act upon other documents than said foremost document of said stack to return said other documents to said stack, said reverse feed block assembly further including a curved surface portion in an abutting relationship with a portion of said stack of documents whereby those documents so abutting to said curved surface are maintained in a stepped relationship to one another.

References Cited by the Examiner

UNITED STATES PATENTS

| | | | |
|---|---|---|---|
| 2,059,546 | 11/1936 | Brandenburg | 214—26 X |
| 2,816,160 | 12/1957 | Young | 271—74 X |
| 3,067,998 | 12/1962 | Cattorini | 271—12 |
| 3,079,149 | 2/1963 | Childs. | |
| 3,103,355 | 9/1963 | Hubbard | 271—34 X |
| 3,126,199 | 3/1964 | Rosoff | 271—12 |

M. HENSON WOOD, Jr., *Primary Examiner.*

J. ERLICH, *Assistant Examiner.*